United States Patent
Tatsuki

(10) Patent No.: US 8,396,073 B2
(45) Date of Patent: *Mar. 12, 2013

(54) VOICE RELAYING APPARATUS AND VOICE RELAYING METHOD

(75) Inventor: Noboru Tatsuki, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 1041 days.

This patent is subject to a terminal disclaimer.

(21) Appl. No.: 12/399,476

(22) Filed: Mar. 6, 2009

(65) Prior Publication Data

US 2009/0175269 A1    Jul. 9, 2009

Related U.S. Application Data

(63) Continuation of application No. 10/755,499, filed on Jan. 12, 2004, now Pat. No. 7,522,635, which is a continuation of application No. 09/333,608, filed on Jun. 15, 1999, now Pat. No. 6,731,651.

(30) Foreign Application Priority Data

Jun. 19, 1998  (JP) .................................... 10-173074

(51) Int. Cl.
   *H04J 3/22*   (2006.01)
(52) U.S. Cl. ...................... 370/465; 370/474; 370/395.1
(58) Field of Classification Search .................. None
   See application file for complete search history.

(56) References Cited

U.S. PATENT DOCUMENTS

| | | | |
|---|---|---|---|
| 5,412,642 A | 5/1995 | Nunokawa | 370/253 |
| 5,654,964 A | 8/1997 | Wake | 370/395.61 |
| 5,873,058 A | 2/1999 | Yajima et al. | 704/201 |
| 5,926,477 A | 7/1999 | Shirokura et al. | |
| 5,940,407 A | 8/1999 | Tamura | 370/493 |
| 5,974,374 A | 10/1999 | Wake | 704/215 |
| 5,987,025 A | 11/1999 | Hokari | |
| 6,172,978 B1 | 1/2001 | Fushimi et al. | |
| 6,345,054 B1 | 2/2002 | Sasaki | |
| 6,363,064 B1 | 3/2002 | Yamaguchi | |
| 6,442,175 B1 | 8/2002 | Shibuya | |
| 6,623,493 B2 | 9/2003 | Wallace et al. | 606/151 |
| 6,671,289 B1 | 12/2003 | Tamura et al. | 370/474 |
| 6,731,651 B1 | 5/2004 | Tatsuki | 370/474 |

FOREIGN PATENT DOCUMENTS

| | | |
|---|---|---|
| JP | 9-55753 | 2/1997 |
| JP | 9-98169 | 4/1997 |
| JP | 10-4415 | 1/1998 |
| JP | 10-173074 | 6/1998 |

OTHER PUBLICATIONS

Co-pending U.S. Appl. No. 10/755,499, filed Jan. 12, 2004, entitled "Voice Relaying Apparatus and Voice Replaying Method," Noboru Tatsuki.

*Primary Examiner* — Bob Phunkulh
(74) *Attorney, Agent, or Firm* — Harrity & Harrity, LLP

(57) ABSTRACT

A voice relaying apparatus includes a receiving section for receiving a cell from an asynchronous transfer mode (ATM) network, a plurality of cell assembling/disassembling units for assembling and disassembling the cells, and a transmitting section for transmitting the cells assembled by each of the plurality of cell assembling/disassembling units. Each of the plurality of cell assembling/disassembling units is composed of a cell disassembling section for disassembling the cell received by the receiving section, a detecting section for detecting whether or not the voice relaying apparatus is carrying out a relay switch operation, and a cell assembling section for assembling the cell disassembled by the cell disassembling section and then sending to the transmitting section, if the fact that the voice relaying apparatus is carrying out the relay switch operation is detected by the detecting section.

20 Claims, 5 Drawing Sheets

Fig. 4

| ADDRESS | bs1 | bv1 | bs2 | bv2 | bs3 | bv3 |
|---|---|---|---|---|---|---|
| DESTINATION | CLD 101 | CLD 102 | CLD 201 | CLD 202 | CLD 301 | CLD 302 |

Fig. 5

| DETECTION SIGNAL | NOTHING | SYNCHRONOUS SIGNAL 116 | SYNCHRONOUS SIGNAL 216 | SYNCHRONOUS SIGNAL 316 |
|---|---|---|---|---|
| ADDRESS SIGNAL | av1 | av1 | av2 | cv1 |

Fig. 6

| DETECTION SIGNAL | NOTHING | SYNCHRONOUS SIGNAL 116 | SYNCHRONOUS SIGNAL 216 | SYNCHRONOUS SIGNAL 316 |
|---|---|---|---|---|
| ADDRESS SIGNAL | av2 | av1 | av2 | cv1 |

Fig. 7

| DETECTION SIGNAL | NOTHING | SYNCHRONOUS SIGNAL 116 | SYNCHRONOUS SIGNAL 216 | SYNCHRONOUS SIGNAL 316 |
|---|---|---|---|---|
| ADDRESS SIGNAL | bv1 | av1 | av2 | cv1 |

VOICE RELAYING APPARATUS AND VOICE RELAYING METHOD

CROSS-REFERENCE TO RELATED APPLICATIONS

This application is a continuation of prior U.S. patent application Ser. No. 10/755,499, filed Jan. 12, 2004, entitled "VOICE RELAYING APPARATUS AND VOICE RELAYING METHOD", which was a continuation of prior U.S. patent application Ser. No. 09/333,608, filed Jun. 15, 1999, entitled "VOICE RELAYING APPARATUS AND VOICE RELAYING METHOD" (now U.S. Pat. No. 6,731,651, issued May 4, 2004), the entire disclosures of which are hereby incorporated by reference herein.

BACKGROUND OF THE INVENTION

1. Field of the Invention

The present invention is related to a voice relaying apparatus and a voice relaying method in order to carry out a digital voice communication in an asynchronous transfer mode (ATM).

2. Description of the Related Art

Conventionally, a digital voice communication network for carrying out an inter-office communication in an asynchronous transfer mode is well known. In this digital voice communication network, a voice signal is relayed and switched in accordance with a procedure described below. At first, a cell received from a relay line is disassembled. As a consequently, a low-bit-rate coding voice signal is produced. This low-bit-rate coding voice signal is further decoded into a PCM voice signal of 64 kbps that can be treated within a digital switch and sent to the digital switch. The digital switch switches this PCM voice signal and outputs the switched PCM voice signal. The PCM voice signal outputted by the digital switch is again encoded into the low-bit-rate coding voice signal, and then assembled into the cell, and further sent to the relay line.

In the above-mentioned relaying and switching method, each time the relay switch operation is carried out by the digital switch, the processes are carried out, such as the disassembling of the cell, the decoding of the low-bit-rate coding voice signal, the encoding of the PCM voice signal and the assembling of the cell. This results in deterioration of quality of the voice sent and received through the digital voice communication network and also leads to increase of a transmission delay time of the voice.

As a first conventional technique to solve this problem, Japanese Laid-Open Patent Disclosure (JP-A-Heisei 9-98169) discloses "VOICE RELAYING AND SWITCHING SYSTEM". In this voice relaying and switching system, a cell received from a relay line is disassembled and converted into the low-bit-rate coding voice signal. Then, a predetermined synchronous signal is added to this low-bit-rate coding voice signal to thereby generate a pseudo digital voice signal, which is sent to a switch. If a digital voice signal switched by the switch includes the predetermined synchronous signal, only the low-bit-rate coding voice signal is extracted from the digital voice signal, and then assembled into the cell, and further sent to the relay line.

Accordingly, when a connection destination of the switch is the relay line, the process for decoding the low-bit-rate coding voice signal and the process for encoding the PCM voice signal can be omitted. As a result, this case can avoid the deterioration of call quality caused by these processes and the increase of transmission delay. However, in this voice relaying and switching system, because the digital voice signal must pass through the section for disassembling the cell, the switch and the section for assembling the cell at a speed of at least 64 kbps, the hardware which operate at high speed is required.

Also, Japanese Laid-Open Patent Disclosure (JP-A-Heisei 10-4415) discloses "DATA TRANSMITTING APPARATUS", as a second conventional technique. FIG. 1 shows the structure of this data transmitting apparatus. This data transmitting apparatus is provided with a switch (PBX) 704, a transcoder 702 and an ATM multiplexer 701. As the PBX 704, a switch that can function as a relay station is employed. The ATM multiplexer 701 is composed of a cell assembling/disassembling device (CLAD) 715 for assembling the cell in accordance with data received from a transcoder 703 and a cell assembling/disassembling device (CLAD) 714 for assembling the cell in accordance with data received from another data transmitting apparatus and then transmitting to the transcoder 702.

In this data transmitting apparatus, when the PBX 704 does not serve as the relay station, the transcoder 703 performs a band compression on the data received from the PBX 704, and sends to the cell assembling/disassembling device 715. Then, the transcoder 702 releases the band compression of the signal from the cell assembling/disassembling device 714, and sends to the PBX 704. However, when the PBX 704 serves as the relay station, the transcoder 703 does not perform the band compression of the data received from the PBX 704, and sends to the cell assembling/disassembling device 715. The transcoder 702 does not release the band compression of the data from the cell assembling/disassembling device 714, and sends to the PBX 704. Hence, when the PBX 704 serves as the relay station, the process for disassembling the cell and the process for assembling the cell can be omitted in the relay station to thereby avoid the deterioration of the call quality and the increase of the transmission delay caused by these processes, even in a case of a multiple-stage relay.

Moreover, Japanese Laid-Open Patent Disclosure (JP-A-Heisei 9-55753) discloses "METHOD FOR RELAYING AND SWITCHING COMPRESSED VOICE IN ATM", as a third conventional technique. In this method for relaying and switching a compressed voice in ATM, it is detected whether or not a cell (digital compression voice data) received from an ATM network is relayed and switched by a digital switch, when it is relayed and switched by the digital switch and again transmitted to the ATM network. When a cell (digital compression voice data) is received from the ATM network, such a check is done that whether or not a relay switch operation is accomplished by the digital switch. Then, if such a fact that the relay switch operation is accomplished is detected, the cell is passed without the compression and expansion of the voice data and the assembling and disassembling of the cell.

SUMMARY OF THE INVENTION

Therefore, the present invention has an object to provide a voice relaying apparatus and a voice relaying method capable of further reducing a delay time when a voice signal is switched.

In order to achieve the above-mentioned object, a voice relaying apparatus according to a first aspect of the present invention includes a cell disassembling section to disassemble the cell received from a network and a detecting section to detect whether or not the voice relaying apparatus is carrying out a relay switch operation. The voice relaying apparatus assembles the cell disassembled by the cell disassembling section if the detecting section detects that the voice relaying apparatus is carrying out the relay switch operation and transmutes the assembled cell to the network.

Also, in order to achieve the above-mentioned similar object, a voice relaying apparatus according to a second aspect of the present invention comprises a receiving section for receiving a cell from an asynchronous transfer mode (ATM) network, a plurality of cell assembling disassembling units for disassembling and assembling the cells and a transmitting section for transmitting the cell assembled by each of the plurality of cell assembling/disassembling units. Each of the plurality of cell assembling/disassembling units is composed of a cell disassembling section to disassemble the cell received by the receiving section, a detecting section to detect whether or not the voice relaying apparatus is carrying out a relay switch operation, a controller to select the cell disassembled by the cell disassembling section if the detecting section detects that the voice relaying apparatus is carrying out the relay switch operation and a cell assembling section to assemble the cell which is selected by the controller, and to supply the assembled cell to the transmitting section.

Accordingly, if the relay switch operation is being carried out, the low-bit-rate coding voice signal obtained by disassembling the received cell is not decoded into the PCM voice signal. In addition, the signal before the pass to the switch is immediately transferred to the relay destination. As a consequently, it is possible to omit the time when data is reciprocated between this voice relaying apparatus and the switch to thereby reduce the delay time when the voice signal is switched.

Moreover, in order to correspond to an actual ATM network needing the discrimination between target destinations (relay destinations) if there are three or more target destination nodes, the voice relaying apparatus according to the present invention can further comprise a unit for reporting the relay destination. Furthermore, it can have the configuration of transferring the cell to the relay destination by changing a destination address in accordance with information of reporting the relay destination.

Moreover, in order to achieve the above-mentioned similar object, a voice relaying method according to a third embodiment of the present invention is provided with the steps of disassembling a cell received from an asynchronous transfer mode (ATM) network, detecting whether or not a relay switch operation is being carried out, selecting the disassembled cell if such a fact that the relay switch operation is being carried out is detected and assembling the selected cell and transmitting.

BRIEF DESCRIPTION OF THE DRAWINGS

A more better understanding of the present invention may be achieved by reading a detailed description in conjunction with the accompanying drawings, in which:

FIG. 4 shows an address table used by a multiplexer/de-multiplexer to assign a received cell to any one of first to third cell assembling and disassembling units;

FIG. 5 shows an address table used to generate a destination address in an address indicator when a call is made between a station "A" and a station "B";

FIG. 6 shows an address table used to generate a destination address in one address indicator when a call is made between the station "A" and a station "C"; and FIG. 7 shows an address table used to generate a destination addresses in another address indicator when the call is made between the station. "A" and the station "C".

DESCRIPTION OF THE PREFERRED EMBODIMENTS

Figure 1:
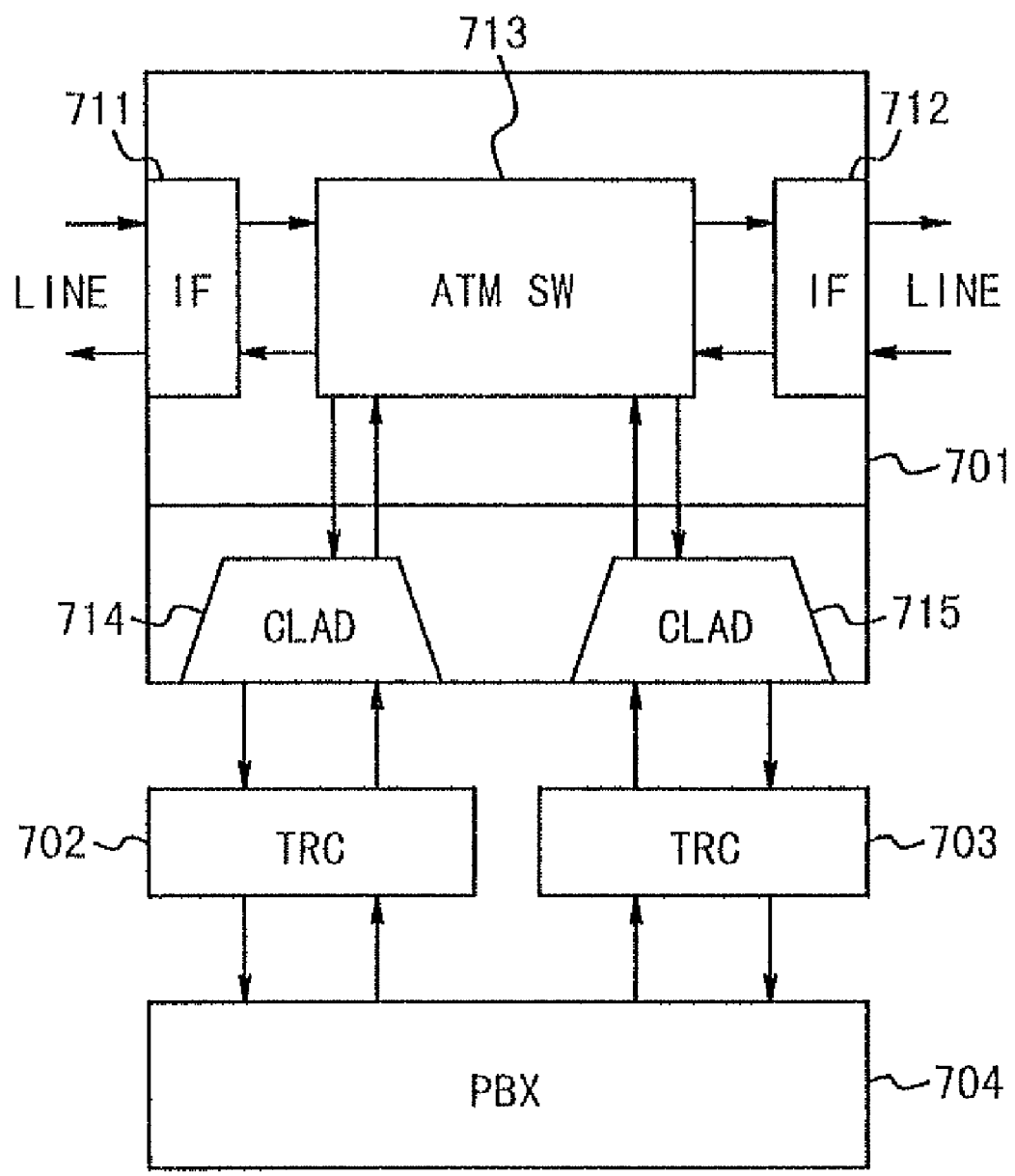
FIG. 1 is an explanatory diagram for explaining a conventional technique.
Figure 2:
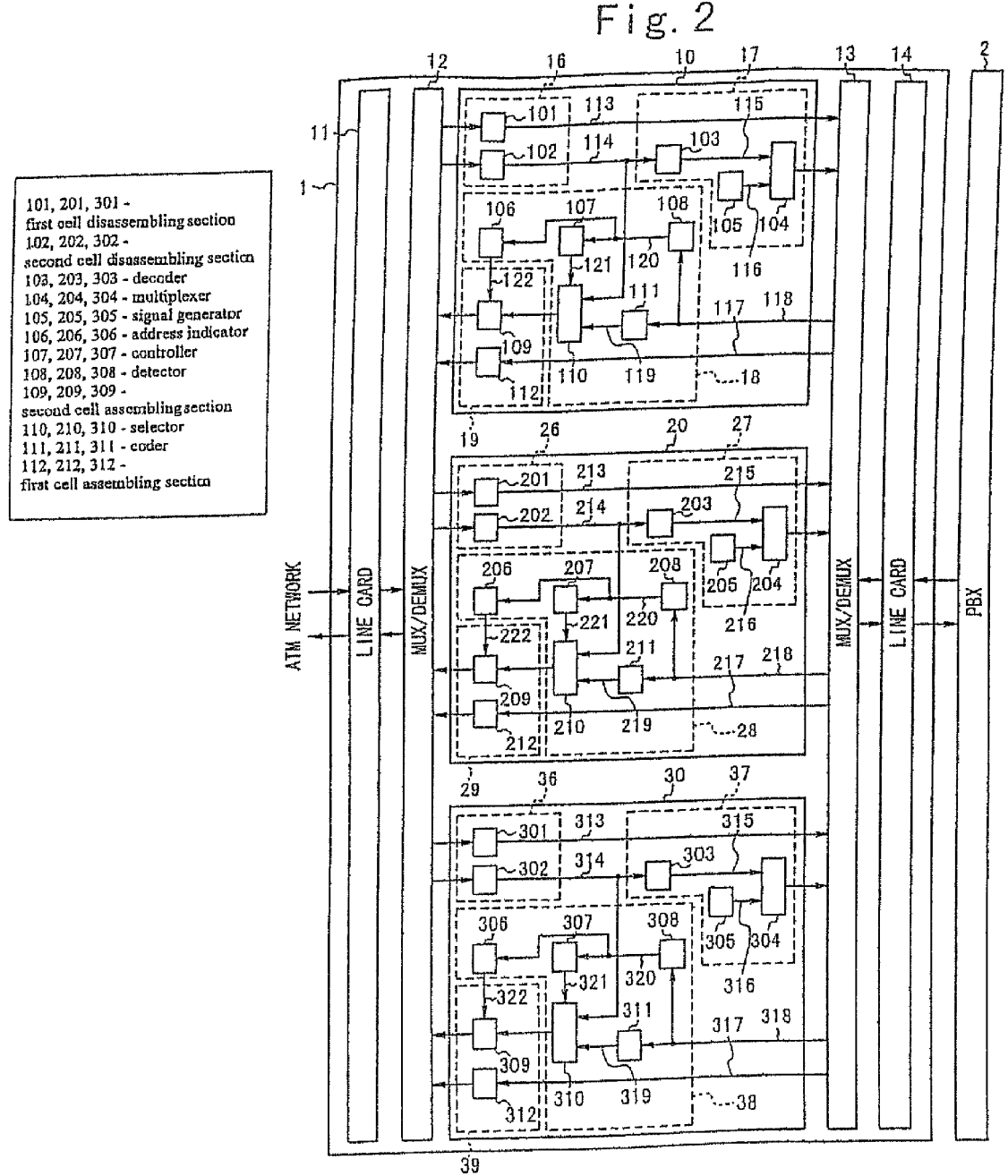
FIG. 2 is a schematic block diagram for indicating a configuration of a voice relaying and switching system to which a voice relaying apparatus according to an embodiment of the present invention is applied.

A voice relaying apparatus according to an embodiment of the present invention will be described in detail below with reference to the attached drawings. FIG. 2 illustratively shows a structure of a voice relaying and switching system to which the voice relaying apparatus according to an embodiment of the present invention is applied. This voice relaying and switching system is provided with a voice relaying unit 1 and a digital switch (hereafter, referred to as "PBX") 2. In addition, FIG. 2 includes a block diagram showing a structure of the voice relaying unit 1 and a block diagram showing a structure of cell assembling/disassembling units 10, and 30 within this voice relaying unit 1.

Figure 3:
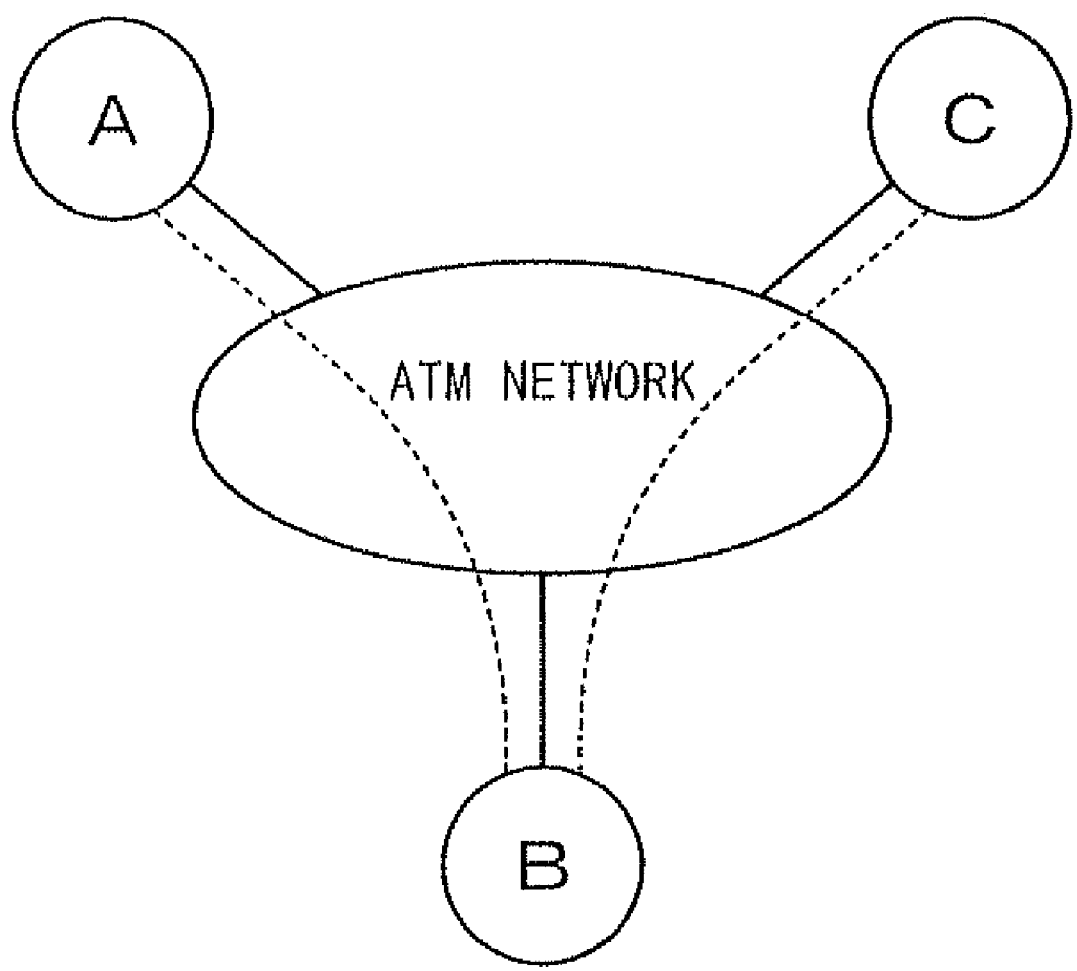
FIG. 3 is an explanatory diagram for conceptually showing a positioning of a voice relaying and switching system including the voice relaying apparatus according to the present invention in an ATM network system.

At first, FIG. 3 conceptually shows the positioning of the voice relaying and switching system including the voice relaying apparatus according to the present invention in an ATM network system. Communication nodes (stations) "A", "B" and "C" are installed in this ATM network system. The voice relaying and switching system shown in FIG. 2 is installed in each node. Respective virtual channels VC are created through the ATM network between the station "A" and the station "B" and between the station "B" and station "C". Hereafter, this embodiment is described assuming that this virtual channel VC is present. It should be noted that FIG. 2 shows the voice relaying and switching system installed in the station "B" but the similar voice relaying and switching systems are also installed in the station "A" and the station "C".

The structure of the voice relaying unit 1 according to the embodiment of the present invention will be described below with reference to FIG. 2. The voice relaying unit 1 is provided with a first line interface section (LINE CARD) 11, a first multiplexing/de-multiplexing section (MUX/DEMUX) 12, a first cell assembling/disassembling unit (CLAD) 10, a second cell assembling/disassembling unit (CLAD) 20, a third cell assembling/disassembling unit (CLAD) 30, a second multiplexing/de-multiplexing section (MUX/DEMUX) 13 and a second line interface section (LINE CARD) 14.

The first line interface section 11 is composed of an interface circuit for connecting this voice relaying unit 1 to the ATM network.

The first multiplexing/de-multiplexing section 12 de-multiplexes a cell received from the ATM network into a signaling cell containing signaling data or a signaling signal and a voice cell containing voice data or a voice signal, and then sends to any of the first cell assembling/disassembling unit 10, the second cell assembling/disassembling unit 20 and the third cell assembling/disassembling unit 30. Also, the first multiplexing/de-multiplexing section 12 multiplexes the signaling cell and the voice cell from any of the first cell assembling/disassembling unit 10, the second cell assembling/disassembling unit 20 and the third cell assembling/disassembling unit 30, and then transmits to the ATM network.

Each of the first cell assembling/disassembling unit 10, the second cell assembling/disassembling unit 20 and the third cell assembling/disassembling unit 30 disassembles the signaling cell and the voice cell from the first multiplexing/de-multiplexing section 12. Also, each of the first cell assembling/disassembling unit 10, the second cell assembling/disassembling unit 20 and the third cell assembling/disassembling unit 30 assembles internally generated or externally supplied signals into the signaling cell and the voice cell to be sent to the first multiplexing/de-multiplexing section 12. These detailed descriptions will be discussed in later.

The second multiplexing/de-multiplexing section 13 multiplexes the signal from any of the first cell assembling/disassembling unit 10, the second cell assembling/disassembling unit 20 and the third cell assembling/disassembling unit 30, and then sends to the second line interface section 14. Moreover, the second multiplexing/de-multiplexing section 13 de-multiplexes the multiplexed signal from the second line interface section 14, and then sends to any of the first cell assembling/disassembling unit 10, the second cell assembling/disassembling unit 20 and the third cell assembling/disassembling unit 30.

The second line interface section 14 is composed of an interface circuit for connecting this voice relaying unit 1 to the PBX 2.

Now, the structures of the first cell assembling/disassembling unit 10, the second cell assembling/disassembling unit 20 and the third cell assembling/disassembling unit 30 will be described. It should be note that since the structures of the second cell assembling/disassembling unit 20 and the third cell assembling/disassembling unit 30 are identical to that of the first cell assembling/disassembling unit 30, only the configuration of the first cell assembling/disassembling unit 10 will be described. This first cell assembling/disassembling unit is provided with a cell disassembling section 16, an identification signal adding section 17, a control section 18 and a cell assembling section 19.

The cell disassembling section 16 is composed of a first cell disassembling section (CLD) 101 and a second cell disassembling section (CLD) 102. The first cell disassembling section 101 extracts a first signaling signal 113 from a signaling cell supplied from the first multiplexing/de-multiplexing section 12, and sends the first signaling signal 113 to the second multiplexing/de-multiplexing section 13. Also, the second cell disassembling section 102 extracts a first voice signal 114, which is a low-bit-rate coding voice signal, from a voice cell supplied from the first multiplexing/de-multiplexing section 12, and sends the first voice signal 114 to the identification signal adding section 17 and the control section 18.

The identification signal adding section 17 is composed of a decoder (DEC) 103, a signal generator (GEN) 105 and a multiplexer (MUX) 104. The decoder 103 decodes the first voice signal 114 from the second cell disassembling section 102 to thereby generate a first PCM voice signal 115 of 64 kbps. The generated first PCM voice signal 115 is send to the multiplexer 104. The signal generator 105 generates a synchronous signal 116, and sends to the multiplexer 104. This synchronous signal 116 is used as a CLAD identification signal indicative of the first cell assembling/disassembling unit 10. The multiplexer 104 multiplexes the first PCM voice signal 115 from the decoder 103 and the synchronous signal 116 from the signal generator 105, and sends the multiplexed signal to the second multiplexing/de-multiplexing section 13.

The control section 18 is composed of a coder (COD) 111, a detector (DET) 108, a controller (CNT) 107, a selector (SEL) 110 and an address indicator (ADR) 106.

The coder 111 converts a second PCM voice signal 118 of 64 kbps from the second multiplexing/de-multiplexing section 13, into a low-bit-rate coding voice signal, and sends it to the selector 110 as a second voice signal 119. The detector 108 detects a synchronous signal included in the second PCM voice signal 118, and generates a detection signal 112 representative of the detection result. This detection signal 112 is sent to the controller 107 and the address indicator 106.

The controller 107 generates a control signal 121 in accordance with a detection signal 120 from the detector 108, and sends the control signal 21 to the selector 110. This control signal 121 is such a signal that the selector 110 select the second voice signal 119 from the coder 111 if the detection signal 120 indicates that the synchronous signal is not detected, and the selector 110 select the first voice signal 114 from the cell disassembling section 102 if the detection signal 120 indicates that the synchronous signal is detected. Therefor, the selector 110 selects any one of the first voice signal 114 from the second cell disassembling section 102 and the second voice signal 119 from the coder 111, in accordance with the control signal 121 from the controller 107, and then sends the selected signal to the cell assembling section 19. The address indicator 106 generates an address indication signal 122 for indicating an address of a transmission destination, in accordance with the detection signal 120 from the detector 108. This address indication signal 122 is sent to the cell assembling section 19.

The cell assembling section 19 is composed of a first cell assembling section (CLA) 112 and a second cell assembling section (CLA) 109. The first cell assembling section 112 assembles a second signaling signal 117 supplied from the second multiplexer/demultiplexer 13 into a signaling cell. The second cell assembling section 109 assembles the first voice signal 114 or the second voice signal 119 sent through the selector 110, into a voice cell. At this time, an address indicated by the address indication signal 122 from the address indicator 106 is set to the voice cell as a transmission destination address.

Next, the operations of the voice relaying apparatus having the above-mentioned structure will be described below with reference to FIGS. 2 to 4. Hereafter, a first case in which a call is made between the station "A" and the station "B" and a second case in which the relay switch operation is carried out in the station "B" to make a call between the station "A" and the station "C" are described.

In the first case, if a voice signal is transmitted from the station "A" to the station "B", the operation is as follows. At first, when the station "B" receives a cell sent through the ATM network from the station "A", the first line interface section 11 supplies the received cell to the first multiplexer/demultiplexer 12. Then, the first multiplexer/demultiplexer 12 de-multiplexes the received cell into a signaling cell and a voice cell. The first multiplexer/demultiplexer 12 also assigns the de-multiplexed signaling cell and voice cell to any of the first cell assembling/disassembling unit 10 the second cell assembling/disassembling unit 20 and the third cell assembling/disassembling unit 30, in accordance with a destination address noted in the received cell. This assignment is carried out in accordance with an address table shown in FIG. 4.

For example, if the destination address of the signaling cell from the station "A" is "bs1", the received signaling cell is sent to the first cell disassembling section 101 of the first cell assembling/disassembling unit 10. In this case, since the destination address of the voice cell from the station "A" is "bv1", the received voice cell is sent to the second cell disassembling section 102 of the first cell assembling/disassembling unit 10.

The first cell disassembling section 101 extracts the first signaling signal 113 from the received signaling cell, and sends the first signaling signal 113 to the second multiplexer/ demultiplexer 13. The second cell disassembling section 102 extracts the first voice signal 114, which is the low-bit-rate coding voice signal, from the received voice cell, and sends the first voice signal 114 to the decoder 103 and the selector 110.

The decoder 103 decodes the received first voice signal 114 to thereby generate the first PCM voice signal 115. Then, the generated first PCM voice signal 115 is send to the multiplexer 104. On the other hand, the signal generator 105 generates the synchronous signal 116 used as the CLAD identification signal.

The multiplexer 104 inserts the synchronous signal 116 from the generator 105 into the first PCM voice signal 115 from the decoder 103. In this inserting operation, for example, a particular voice signal is determined for each several bytes of the first PCM voice signal 115, and then the synchronous signal 116 is inserted into LSB (Least Significant Bit) of this particular voice signal. If the synchronous signal 116 is inserted into the first PCM voice signal 115 in this manner, even when it is decoded into an analog signal by the decoder of the PBX 2, the original voice signal can be reproduced without any actual trouble.

On the other hand, if a voice signal is transmitted from the station "B" to the station "A", the operation is as follows. Here, let us consider that a voice signal from the PBX 2 is de-multiplexed by the second multiplexer/demultiplexer 13, and is sent to the first cell assembling/disassembling unit 10. In this case, the second signaling signal 117 from the second multiplexer/demultiplexer 13 is inputted to the first cell assembling section 112. The first cell assembling section 112 assembles this second signaling signal 117 into a cell, and further sets "as1" indicative of a port 1 of the station "A" as the destination address, and sends to the first multiplexer/demultiplexer 12.

Also, the second PCM voice signal 118 from the second multiplexer/demultiplexer 13 is sent to the coder 111 and the detector 108. The coder 111 converts this second PCM voice signal 118 into the low-bit-rate coding voice signal, and sends the low-bit-rate coding voice signal to the selector 110 as the second voice signal 119.

The detector 108 detects whether or not the synchronous signal is contained in the second PCM voice signal 118. In this case, the station "B" is under controlling the call between the station "A" and the station "B", and is not under controlling the relay, switch operation. Thus, the second PCM voice signal 118 is a signal encoded by a coder (not shown) in the PBX 2. Hence, the second PCM voice signal does not contain the synchronous signal. As a result, the detector 108 supplies the detection signal 120 indicating that the synchronous signal is not detected to the controller 107 and the address indicator 106.

The controller 107, since the detection signal 120 from the detector 108 indicates that the synchronous signal is not detected, selects the second voice signal 119 from the coder 111, and then sends the selected second voice signal 119 to the second cell assembling section 109.

Simultaneously with the above-mentioned selecting operation, the address indicator 106 generates the address indication signal 122 in response to the detection signal 120 from the detector 108. The address indication signal 122 is generated in accordance with, for example, an address table shown in FIG. 5. The generate address indication signal 122 is send to the second cell assembling section 109. The second cell assembling section 109 assembles the second voice signal 119 supplied via the selector 110, into a voice cell. Then, the second cell assembling section 109 sets the destination address of the voice cell to "av1" indicative of the port 1 of the station "A" in accordance with the address indication signal 122 from the address indicator 106, and then supplies to the first multiplexer/demultiplexer 12.

The second multiplexer/demultiplexer 12 multiplexes the signaling cell containing the second signaling signal 117 from the first cell assembling/disassembling unit 10 and the voice cell containing the second voice signal 119, and sends the multiplexed cells through the first line interface section 11 to the ATM network. In the ATM network, the multiplexed cells are transferred to the station "A" in accordance with the destination address of each cell. In the station "A", the multiplexed cells are distributed to the port 1, and then decoded into each signaling signal and voice signal. These signaling signal and voice signal are supplied to the PBX. The above-mentioned operations enable the call to be made between the station "A" and the station "B".

Next, the second case in which the relay switch operation is carried out in the station "B" to make a call between the station "A" and the station "C" will be described below. In this second case, since the virtual channel VC is not present between the station "A" and the station "C", the station "A" and the station "C" are connected to each other through the relay switch operation in the station "B". A call path in this second case is composed of a first call path from the station "A" to the station "B" and a second call path from the station "B" to the station "C". After the establishment of both the first call path and the second call path, the PBX 2 in the station "B" connects these two call paths to each other. This enables the call to be made between the station "A" and the station "C". Each of the operation in the first call path and the operation in the second call path is identical to the above-mentioned operation (the operation between the station "A" and the station "B").

Here, the process carried out in the PBX 2 for connecting the two call paths is described in detail with reference to FIGS. 2 and 3. For the convenience of description, let us suppose that the first cell assembling/disassembling unit 10 in the station "B" is used to connect with the station "A", and the second cell assembling/disassembling unit 20 in the station "B" is used to connect with the station "C", respectively.

The PBX 2 sends a signal including the first PCM voice signal 115 to which the synchronous signal 116 is added, derived from the first cell assembling/disassembling unit 10, namely, the call path from the station "A" to the call path to the station "C", namely, the second cell assembling/disassembling unit 20. On the contrary, the PBX 2 sends a signal including the first PCM voice signal 215 to which a synchronous signal 216 is added, derived from the second cell assembling/disassembling unit 20, namely, the call path from the station "C", to the call path to the station "A", namely, the first cell assembling/disassembling unit 10. Accordingly, the detector 108 of the first cell assembling/disassembling unit 10 detects the synchronous signal 216 generated in the second cell assembling/disassembling unit 20. Also, a detector 208 of the second cell assembling/disassembling unit 20 detects the synchronous signal 116 generated in the first cell assembling/disassembling unit 10.

Next, the controller 107 generates such a control signal 121 that the selector 110 selects the first voice signal 114 from the second cell disassembling section 102, in accordance with the detection signal 120 from the detector 108. The selector 110 selects the voice signal in accordance with this control signal 121. Similarly, a controller 207 generates such a control signal 221 that a selector 210 selects a first voice signal 214 from a second cell disassembling section 202, in accordance with a detection signal 220 from a detector 208. The selector 210 selects the voice signal in accordance with this control signal

221. Also, the address indicator 106 generates the address indication signal 122, in accordance with the detection signal 120 from the detector 108. Similarly, an address indicator 206 generates an address indication signal 222, in accordance with a detection signal 220 from the detector 208.

The address indicator 106 generates "av2" as the address indication signal 122, in accordance with an address table shown in FIG. 6. Then, the second cell assembling section 109 sends the voice cell in which the destination address is changed in accordance with the address indication signal 122, through the first multiplexer/demultiplexer 12 and the first line interface section 11 to the ATM network. Accordingly, the voice signal (the first voice signal 114) from the first cell assembling/disassembling unit 10 is sent to the station "C".

Similarly, the address indicator 206 generates "av1" as the address indication signal 222, in accordance with an address table shown in FIG. 7. Then, the second cell assembling section 209 sends the voice cell in which the destination address is changed in accordance with the address indication signal 222, through the first multiplexer/demultiplexer 12 and the first line interface section 11 to the ATM network. Accordingly, the voice signal (the first voice signal 214) from the second cell assembling/disassembling unit 20 is sent to the station "A".

The voice signal from this first cell assembling/disassembling unit 10 is originally the voice signal from the station "A", and the voice signal from the second cell assembling/disassembling unit 20 is the voice signal from the station "C". Accordingly, the call path is accomplished between the station "A" and the station "C". At this time, the first voice signal 114 and the first voice signal 214, which are the low-bit-rate coding voice signals, are not decoded into the PCM voice signals. Moreover, the signal before supplying to the PBX can be immediately transferred to the relay destination.

The voice relaying apparatus and the voice relaying method according to the present invention, when the relay switch operation is carried out in the ATM network, the low-bit-rate coding voice signal is not decoded into the PCM voice signal. Moreover, the signal before supplying to the PBX is immediately transferred to the relay destination. Consequently, the time of the reciprocation between the voice relaying apparatus and the PBX can be shortened and the delay time can be decreased.

What is claimed is:

1. A network device comprising:
   a first cell assembly and disassembly unit comprising:
      a first input to receive a particular cell;
      a cell disassembling section to disassemble the particular cell into a voice signal;
      a second input to receive a particular signal;
      a control section to determine whether a relay switch operation is being carried out based on whether a synchronous signal is present in the particular signal;
      a cell assembling section to assemble the voice signal into a new cell when the relay switch operation is being carried out; and
      a transmitting section to transmit the new cell.

2. The network device of claim 1, where the particular cell is an asynchronous transfer mode (ATM) cell.

3. The network device of claim 1, where the cell disassembling section comprises:
   a first cell disassembling section to extract a first signaling signal from the particular cell; and
   a second cell disassembling section to extract a first voice signal from the particular cell.

4. The network device of claim 3, where the first cell assembly and disassembly unit further comprises:
   an identification signal adding section to add an identification signal to the first voice signal.

5. The network device of claim 3, where the first cell assembly and disassembly unit further identification signal adding section comprises:
   a decoder to generate a first pulse code modulation (PCM) voice signal by decoding the first voice signal;
   a signal generator to generate a synchronous signal; and
   a multiplexer to combine the first PCM voice signal and the synchronous signal to produce the voice signal.

6. The network device of claim 3, where the control section is further to select the first voice signal or a pulse code modulation (PCM) voice signal received by the network device.

7. The network device of claim 6, where the control section comprises:
   a coder to receive the PCM voice signal;
   a detector to:
      detect a synchronous signal included in the PCM voice signal, and
      generate a detection signal that indicates that the synchronous signal is detected;
   a controller to:
      receive the detection signal from the detector, and
      generate a control signal based on the detection signal;
   a selector to:
      select the first voice signal based on the synchronous signal being detected; and
   an address indicator to:
      receive the detection signal from the detector, and
      generate an address indication signal based on the detection signal.

8. The network device of claim 3, where the cell assembling section comprises:
   a first cell assembling section to assemble a second signaling signal from the particular signal; and
   a second cell assembling section to assemble the first voice signal or a second voice signal based on the particular signal.

9. The network device of claim 1, further comprising:
   a second cell assembly and disassembly unit; and
   a relay switch to connect a call path between a first call station connected to the first cell assembly and disassembly unit and a second call station connected to the second cell assembly and disassembly unit.

10. The network device of claim 1, where the control section is further to select an address from an address table based on information included in the synchronous signal when the synchronous signal is present in the particular signal,
   the address being used to transmit at least a portion of the particular signal.

11. A method comprising:
   disassembling, by a disassembling section of a first unit of a network device, a cell into a first signal;
   determining, by a control section of the first unit, whether a relay switch operation is being carried out by the network device;
   selecting, by the control section, the first signal when the relay switch operation is being carried out,
      a second signal, received from a second unit of the network device, being selected when the relay switch operation is not being carried out; and
   assembling, by an assembling section of the first unit, a new cell based on the first signal or the second signal; and
   sending, by the network device, the new cell.

12. The method of claim 11,
where the first unit is associated with a first call station, and where the second unit is associated with a second call station.

13. The method of claim 11, further comprising:
receiving a different signal from the second unit of the network device,
where determining whether the relay switch operation is being carried out comprises:
determining whether a synchronous signal is present in the different signal, and
determining that the relay switch operation is being carried out when the synchronous signal is present in the different signal.

14. The method of claim 13, further comprising:
extracting address information from the synchronous signal when the synchronous signal is present in the different signal.

15. The method of claim 14, further comprising:
sending at least part of the different signal to a destination identified by the address information.

16. The method of claim 11, where disassembling the cell comprises:
extracting a first signaling signal from the cell; and
extracting a first voice signal from the cell.

17. The method of claim 16, further comprising:
combining the first voice signal with a synchronous signal that associates the first voice signal with the first unit of the network device to produce the voice signal.

18. A method comprising:
receiving, by a network device, a cell;
disassembling, by the network device, the cell into data;
receiving, by the network device, a particular signal, the particular signal being distinct from the cell;
determining, by the network device, that a relay switch operation is being carried out based on whether a synchronous signal is present in the particular signal;
assembling, by the network device, a new cell based on the data after determining that the relay switch operation is being carried out; and
transmitting, by the network device, the new cell.

19. The method of claim 18, where the cell is an asynchronous transfer mode (ATM) cell.

20. The method of claim 18, where determining that the relay switch operation is being carried out includes:
determining that the synchronous signal is present in the particular signal, and
determining that the relay switch operation is being carried out based on the synchronous signal being present in the particular signal.

* * * * *